United States Patent [19]

Gaillard et al.

[11] Patent Number: 5,047,681
[45] Date of Patent: Sep. 10, 1991

[54] CONSTANT POWER SYNCHRONOUS MOTOR WITH MICROPROCESSOR CONTROL

[75] Inventors: Gabriel Gaillard, Dijon; André Régis, Talant; Patrick Fage, Fontaine les Dijon, all of France

[73] Assignee: GEC Alsthom SA, Paris, France

[21] Appl. No.: 463,732

[22] Filed: Jan. 11, 1990

[30] Foreign Application Priority Data

Jan. 11, 1989 [FR] France ................................ 89 00264
Oct. 2, 1989 [FR] France ................................ 89 12843

[51] Int. Cl.$^5$ ............................................ H02K 21/12
[52] U.S. Cl. .................................... 310/156; 310/256; 318/661
[58] Field of Search ............... 310/156, 256, 261, 162; 318/567, 601, 605, 661

[56] References Cited

U.S. PATENT DOCUMENTS 3,072,813  1/1963  Reijnst et al. ........................ 310/156
4,296,544  10/1981  Burgmeier et al. .................. 310/156
4,405,873  9/1983  Nondahl ............................. 310/156

FOREIGN PATENT DOCUMENTS 216321  11/1956  Australia ............................. 310/156

OTHER PUBLICATIONS

Proceedings of the IEEE, vol. 70, No. 2, Feb. 1982, New York, U.S., pp. 116–135; B. K. Bose: "Adjustable speed AC drives-a technology status review".

Primary Examiner—Steven L. Stephan
Assistant Examiner—D. L. Rebsch
Attorney, Agent, or Firm—Sughrue, Mion, Zinn Macpeak & Seas

[57] ABSTRACT

The synchronous motor has a pick-up (C) measuring the position of its rotor and a power-varying circuit (VP) operating as a current generator. A power-varying circuit (VP) is controlled by a programmed microprocessor (MP) receiving information specifying the desired speed for the motor (M), information representative of the difference between the current speed and the desired speed for the motor, information from said pick-up relating to the position of the rotor of the motor, and stored information in order to enable it to force zero phase difference between the current I delivered by the power-varying circuit and the potential difference U across the terminals of the motor windings, thereby minimizing the installed power required of the power-varying circuit in order to run the synchronous motor and power-varying circuit at constant power. A control system operates the motor at constant power. The value of the reluctance to the flux of the magnets adjacent to the shaft of the motor by the connection part lies between 10 times and 20 times the reluctance to the flux of the magnets at the air gap of the motor.

4 Claims, 2 Drawing Sheets

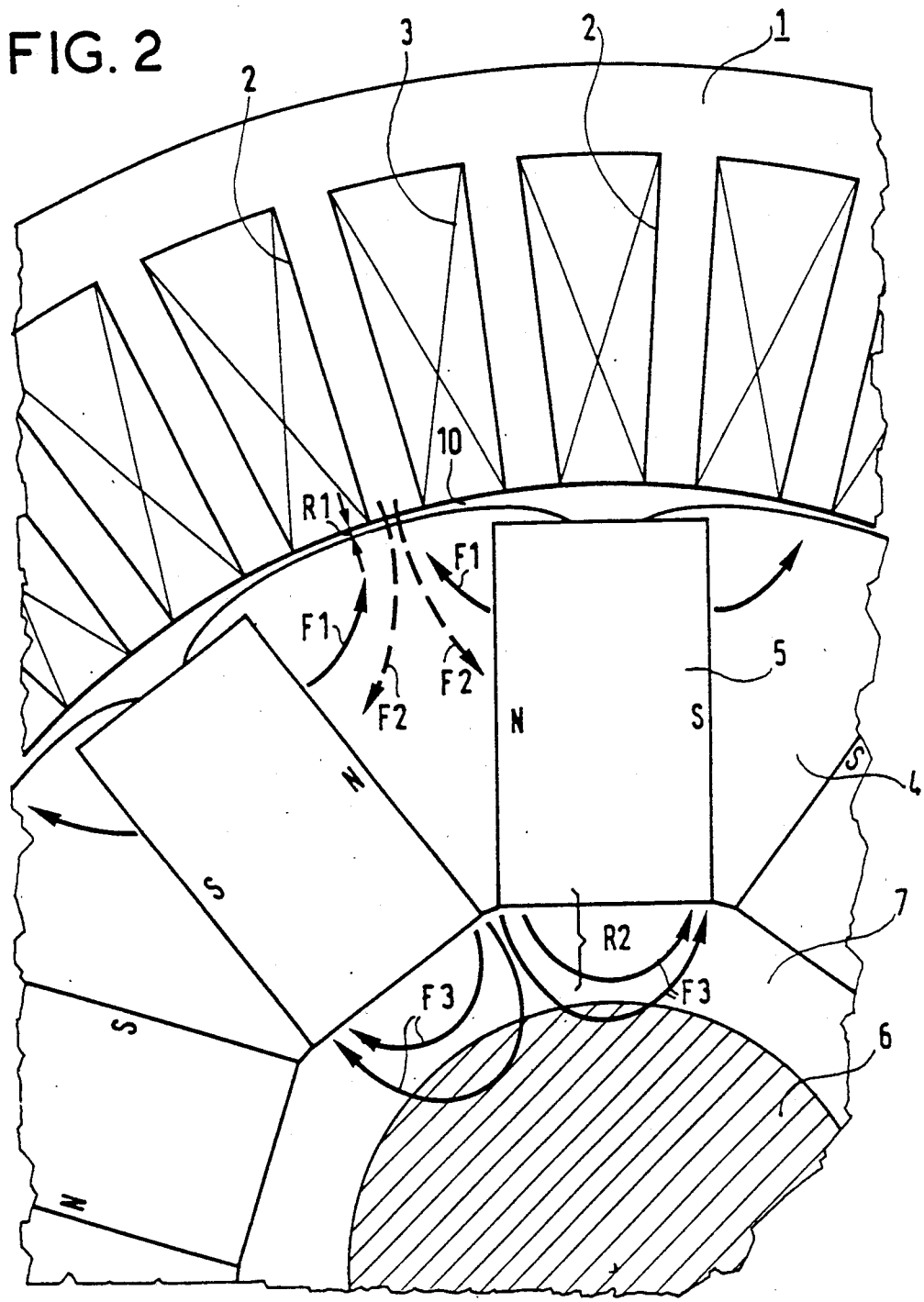

CONSTANT POWER SYNCHRONOUS MOTOR WITH MICROPROCESSOR CONTROL

FIELD OF THE INVENTION

The present invention relates to a synchronous motor adapted to operate at constant power over a large range of speeds.

The invention also relates to a control system for said motor.

BACKGROUND OF THE INVENTION

Constant power operation of a synchronous motor having magnets has been mentioned in the document: Proceedings of the IEEE, Vol. 70, No. 2, Feb. 1982, New York, US, pages 116-135; B.K. Bose "Adjustable Speed AC Drives—A Technology Status Review".

With a synchronous motor, in order to obtain a wide operating range at constant power, it is necessary to make use of a large amount of phase advance.

With a synchronous motor having conventional magnets, this large phase advance (up to 90°) gives rise to too high a level of current when the motor is operating unloaded, which level may exceed the thermal limit for the parts in question and may present a severe risk of the rotor magnets becoming demagnetized, thereby reducing machine reliability and performance.

This solution also requires the use of an electronic power supply varying circuit having very high installed power compared with the mechanical power obtained, thus giving rise to a compromise which is economically unfavorable.

An object of the present invention is to provide a synchronous motor capable of operating at constant power over a wide range of speeds, e.g. lying between a given base speed $N_0$ and four times said value.

Another object of the invention is to provide a control system associated with the above motor and suitable for attaining the following objectives:
1/ ensuring that under all possible situations the current is controlled and within permissible limits for the motor;
2/ ensuring that the magnetization state of the rotor magnets is preserved, i.e. avoiding any risk of demagnetization;
3/ obtaining a minimum value for motor iron losses during periods of operation at maximum speed; and
4/ optimizing the ratio between the installed power of the electronic power supply varying circuit and the mechanical shaft power obtained.

SUMMARY OF THE INVENTION

These objects are achieved by the invention which provides a synchronous motor having magnets of the flux-concentration type, the motor comprising a rotor provided with magnets positioned radially within the rotor having an azimuthal magnetization direction, the motor having a connection part, whose value of reluctance to the flux of the magnets adjacent to the shaft of the motor lies between 10 times and 20 times the reluctance offered to the flux of the magnets at the air gap of the motor.

The invention also provides a control circuit for operating a motor of the above-specified type at constant power, said synchronous motor being associated with a pick-up measuring the position of its rotor, and a power-varying circuit operating as a current generator. The control system being characterized in that the power-varying circuit is controlled by a programmed microprocessor receiving information specifying the desired speed for the motor, information representative of the difference between the current speed and the desired speed for the motor, information from said pick-up relating to the position of the rotor of the motor, and stored information in order to enable it to force zero phase difference between the current I delivered by the power-varying circuit and the potential difference U across the terminals of the motor windings, thereby minimizing the installed power required of the power-varying circuit in order to run the synchronous motor and power-varying circuit at constant power.

Advantageously, the pick-up is selected from the group constituted by: resolvers; rotary transformer resolvers; reluctance pick-ups; and optical pick-ups.

Also, the program is designed to adjust the polarity of the pick-up to that of the motor.

BRIEF DESCRIPTION OF THE DRAWINGS

The invention will be well understood from the explanations given below with reference to the accompanying drawings, in which:

FIG. 1 is a vector diagram showing operation of a synchronous motor with a phase advance of 90°;

FIG. 2 is an axial section through a synchronous motor having magnets and in accordance with the invention;

DESCRIPTION OF THE PREFERRED EMBODIMENT

Figure 3:
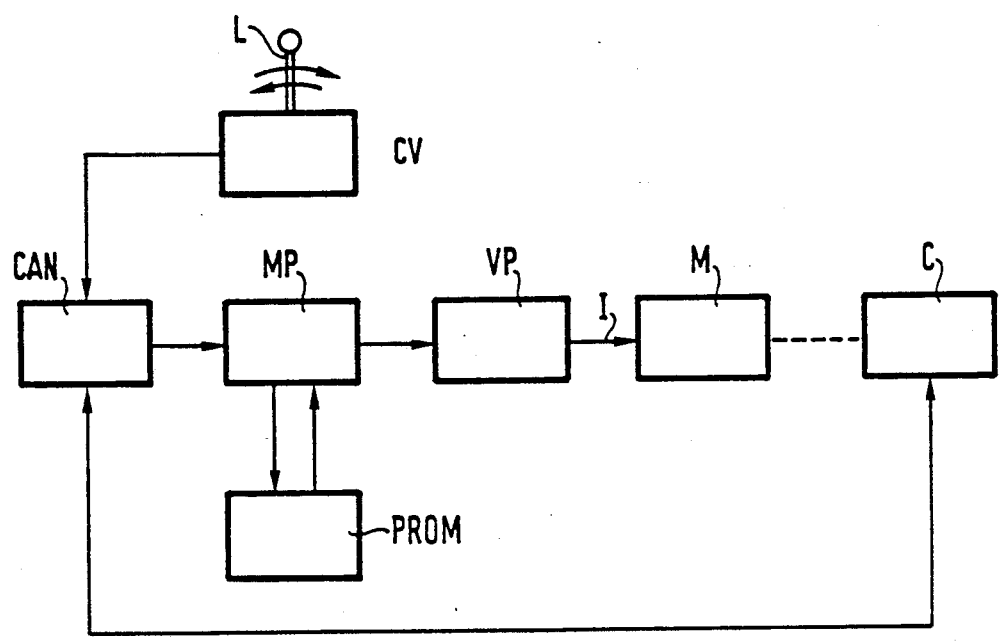
FIG. 3 is a block diagram of a control system of the invention.

In a synchronous motor M having magnets, for which it is desired to use a major phase advance, e.g. 90°, the vector diagram appears as shown in FIG. 1, where:

E = the electromotive force (e.m.f.) of the motor;
U = the potential difference across the terminals of the motor windings; and
L, R = inductance and resistance of the motor.

The e.m.f. E is an intrinsic characteristic of the motor.

The potential difference U is imposed by the varying circuit. Its value may be changed according to requirements.

The inductance L is an intrinsic characteristic of the motor.

The current I is a resultant.

In order to obtain an operating range equal to or greater than four, it is necessary for the amplitude of the vector U to be capable of reaching a value which is four times smaller than the amplitude of the vector E, i.e. it is necessary for the amplitude of the vector LωI (ignoring the value of the vector RI which remains small) to be capable of reaching about ¾ of the amplitude of the vector E.

This means that, if these conditions are satisfied, the value of the current I at a given speed remains within permissible limits for the motor.

A motor structure should therefore be provided such that its internal self-inductance satisfies these conditions without adding any self-inductance external to the motor and connected in series therewith.

If a minimum value of self-inductance were to be obtained by adding a self-inductance external to the motor, the current would indeed be reduced to the desired value, but this solution would lead to two major drawbacks:

a/ excessively high voltages at the terminals of the motor windings; and b/ excessive iron losses when operating at high speed.

Since the vector LwI is to reach values equal to or greater than ¾ of the vector E, the vector U is necessarily small compared with the vector E. The vector U represents the flux in the stator windings resulting from the actions of the current I and the magnet flux, and the vector E represents the flux created in the stator by the rotor magnets on their own (when there is no current flowing in the stator winding). This reduction in magnetic flux in the stator due to the action of the current may cause the rotor magnets to back off and bring them close to the demagnetization threshold.

Under these conditions, unless a second circuit is provided to convey the magnet flux of the magnets, the magnets are constrained to operate at their demagnetization limit and this is a precarious situation for motor reliability and performance.

The synchronous motor with magnets proposed for operating in this way is constituted by a stator and a rotor, said rotor being constructed in such a manner that when the phase advance reaches large values and the current I reaches high levels, the presence of the vector LwI causes a large portion of the magnet flux to flow through the central portion of the rotor, thereby avoiding the danger of demagnetization. An example of the motor M of the invention is shown in FIG. 2.

Reference 1 designates a stator body of magnetic material having slots 2 in which windings 3 are disposed.

Reference 4 designates rotor laminations which are cut and assembled to define housings in which magnets 5 are placed. The magnets are magnetized in the azimuth direction, i.e. perpendicular to the axis of the motor and substantially perpendicular to a radial plane passing through the magnet. Reference 6 designates the shaft of the machine and reference 7, designates a magnetic material part 7 defining a low reluctance connection part between the shaft and the rotor laminations.

Reference 10 designates the air gap between the rotor and the stator.

Arrow F1 represents the magnetic flux established by the magnet, whereas arrow F2 represents the magnetic flux generated by the windings 3. It can be seen that the configuration of the motor of the invention does not run the risk of demagnetizing the magnets since the magnet flux can loop itself by taking a fall-back path designated by arrow F3 adjacent to the motor shaft. The Applicant has observed that optimum operation can be obtained by having a magnetic flux fall-back path for the magnets with a reluctance R2 lying between 10 times and 20 times the reluctance R1 offered to the magnet flux adjacent to the air gap 10. The person skilled in the art will easily be able to select the nature and the thickness of material required for the magnetic material connection part 7 to satisfy the above conditions.

With a rotor defined in this way, the internal self-inductance L should have a value such that, for a ratio (Nmax/N$_0$)≧4 and at maximum speed, the current I remains within the limits fixed for the motor.

FIG. 3 shows a control system of the invention.

The motor M is associated with a pick-up C for sensing the position of the rotor. The pick-up is of the resolver type, and is preferably constituted by a brushless rotary transformer. In a variant, the pick-up could be an optical encoder, or a reluctance pick-up, or more generally any type of pick-up providing position information with sufficient accuracy. The motor is powered by an electronic power varying circuit VP which delivers current as a function of the power required of the motor.

The operator has a speed control CV, e.g. provided with a control lever L (or in a variant, a keypad), which generates a signal that is a function of the desired speed.

This signal is digitized by an analog-to-digital converter CAN and applied to a microprosessor MP. The microprocessor also receives the signal representative of the position of the motor rotor as digitized by the analog-to-digital converter CAN, together with a signal relating to the difference between the actual speed of the motor and the desired speed. The microprocessor also has prerecorded information available in a programmable read only memory PROM. This information is designed to make it possible to maintain a zero phase difference between the current I applied by the power-varying circuit to the stator windings of the motor and the potential difference U across the terminals of the motor windings.

This disposition makes it possible to reduce the reactive power flowing through the electronic power-varying circuit and consequently makes it possible to optimize the volt-amp rating of the circuit relative to the mechanical power desired on the motor shaft.

The potential difference U is constituted by the e.m.f. of the motor E combined with the action of the current I on the resistance R and the inductance L of the stator windings of the motor.

It should be observed that the program for the microprocessor is designed to match the polarity of the pick-up to that of the motor.

Figure 4:
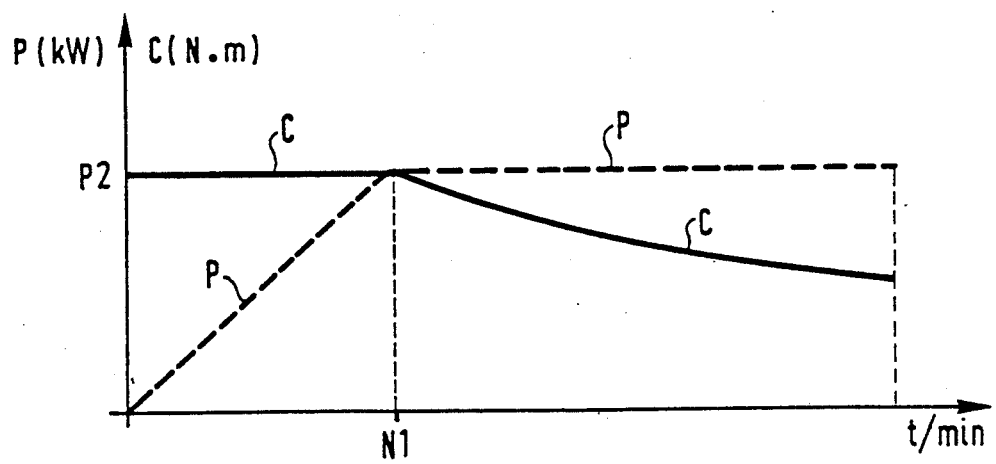
FIG. 4 is a graph showing power-speed and torque-speed curves relating to a motor of the invention with a control system of the invention.

The control system of the invention makes it possible to obtain motor operation as shown in the graphs of FIG. 4.

The power absorbed by the motor increases with speed up to a given value N1, while torque remains constant.

Beyond this speed value, power remains constant while torque falls off.

We claim:

1. A control system for operating a synchronous motor at constant power, said synchronous motor comprising magnets of the fluxconcentration type, the motor comprising a rotor provided with magnets positioned radially within the rotor having an azimuthal magnetization direction, and wherein the value (R2) of the reluctance to the flux of the magnets of a connection part (7) adjacent to the shaft (6) of the motor lies between 10 times and 20 times the reluctance of an air gap (10) of the motor, said system comprising a pick-up (C) measuring the position of its rotor, and a power-varying circuit (VP) operating as a current generator, and said power-varying circuit (VP) being controlled by a programmed microprocessor (MP) receiving information specifying the desired speed for the motor (M), information representative of the difference between the current speed and the desired speed for the motor, information from said pick-up relating to the position of the rotor of the motor, and stored information in order to enable the system to cause a zero phase difference between the current I delivered by the power-varying circuit and the potential difference U across the terminals of the motor windings, thereby minimizing the installed power required of the powervarying circuit in order to run the synchronous motor and powervarying circuit at constant power.

2. A control system according to claim 1, characterized in that the pick-up is selected from the group constituted by: resolvers; rotary transformer resolvers; reluctance pick-ups; and optical pick-ups.

3. A control system according to claim 1, characterized in that the program is designed to adjust the polarity of the pick-up to that of the motor.

4. A control system according to claim 2, characterized in that the program is designed to adjust the polarity of the pick-up to that of the motor.

* * * * *